Patented May 12, 1942

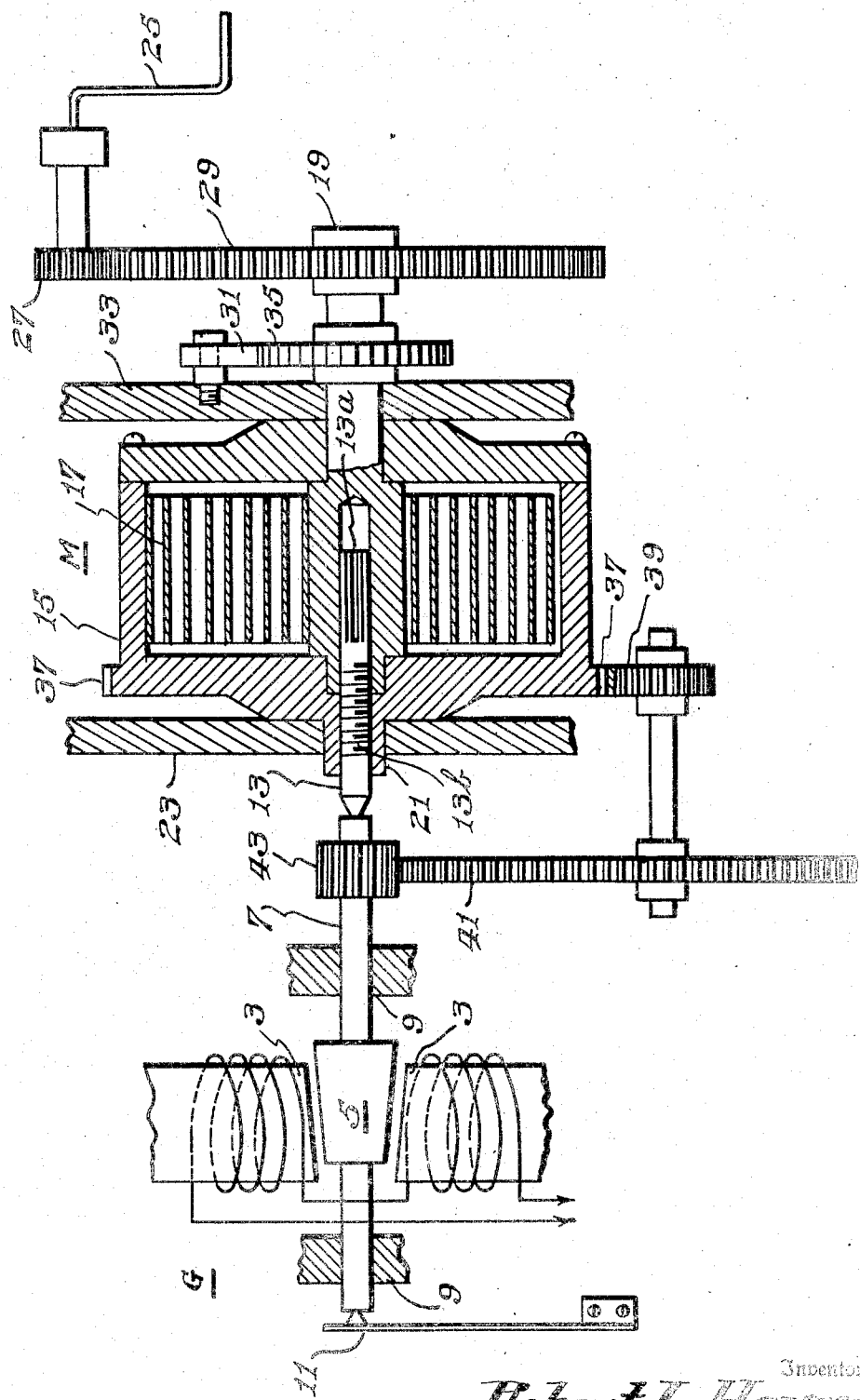

2,282,963

UNITED STATES PATENT OFFICE 2,282,963

SPRING DRIVEN ELECTRIC GENERATOR

Robert Leslie Haynes, Haddon Heights, N. J., assignor to Radio Corporation of America, a corporation of Delaware Application August 24, 1940, Serial No. 354,029

5 Claims. (Cl. 290—1)

This invention relates to spring driven electric generators, such, for example, as may be employed in generating current for portable radio apparatus and the like.

If an ordinary generator is operated with a resistance load, and driven by a spring motor, its output will decrease as the spring unwinds. This is so because the driving torque supplied by the spring decreases as the spring unwinds. The torque applied by a spring motor to the rotor of a generator could, of course, be made of a constant value by utilizing an oversize spring and working it at low efficiency, as by means of a centrifugally operated brake or the like. Such an expedient, however, would negative the very characteristics sought in a spring driven generator, i. e., compactness, efficiency and ease of operation.

Accordingly, the principal object of the present invention is to provide an efficient and compact spring driven electric generator and one capable of producing a practically constant output in spite of variations in the available driving torque.

The foregoing and other objects are achieved in accordance with the invention by means of a spring motor which is provided with a preferably axially movable control element, the position of which with respect to a fixed point, at any given instant, is determined by the condition of tension of the spring motor. Movement of this control element may be utilized in any of various ways for controlling the field excitation of the generator. By way of example, it may be employed to vary the field current supplied to the generator or, preferably, to vary its field excitation as by physically moving the rotor and stator elements of the generator with respect to each other. Thus, the generator may be provided with a preferably tapered rotor, mounted to permit of axial movement with respect to the stator, so that the length of the air gap therebetween as well as the effective area of the gap is varied in response to the axial movement initiated by the control element of the spring motor.

In the accompanying longitudinal, partly diagrammatic, sectional view of a spring driven electric generator embodying the invention, G designates generally an electric generator the output of which is to be rendered constant, and M is a spring motor for driving the generator. The generator G comprises a stationary member 3 and a rotating member 5 which is of tapered construction and is fixed to a shaft 7 which is mounted on bearings 9 to permit both rotary and axial movement with respect to the stationary member. The rotor shaft 7 is biased outwardly, i. e., to right as viewed in the drawing, by means of a spring 11 which tends to urge the rotor 5 away from the stator elements.

As will hereinafter more fully appear, a control element 13 forming part of the spring motor M is moved to its position of maximum extension when the torque available from the motor is of maximum intensity, that is, when the spring of the motor is completely wound. When the control element 13 is thus extended, the rotor shaft 7 of the generator G is moved against the force of its biasing spring 11 to that position whereat the rotary element 5 is completely within the stator element 3. As the torque generated by the motor M decreases, that is, as its spring unwinds, the control element 13 moves inwardly with respect to the rotor. The shaft 7 of the generator G thus is urged by its biasing spring 11 to follow the control element and this axial movement of the shaft 7, to the right, withdraws the rotor 5 from the stator. As the rotor 5 is gradually withdrawn from the stator, the "drag" exerted thereon decreases and this is reflected in an increase in its speed of rotation which compensates, electrically, for the gradual decrease in the driving torque applied thereto as the spring motor M runs down.

The motor here illustrated comprises a rotatable housing 15 for a conventionally coiled spring 17 which is preferably anchored at its outer end to the inner wall of the housing and at its inner end to a shaft 19 which extends into the housing and serves as one bearing surface therefor. A hollow stub shaft 21 on the opposite surface of the housing is journaled for rotation in a frame member 23 and comprises a second bearing for the housing 15. The spring 17 may be wound as by means of a hand crank 25 which operates through a pinion 27 and a gear 29 to turn the shaft 19 to which the inner terminal of the spring 17 is fixed. A pawl 31, which may be mounted on the frame member 33 in which the shaft 19 is journaled, engages a ratchet wheel 35 on the said shaft and prevents its rotation in the unwinding direction.

In unwinding, the force of the spring 17 is exerted against the housing 15, causing it to rotate and to drive the rotor 7 of the generator G through a gear train comprising gears 37, 39, 41 and 43.

The control element 13 which operates, preferably in the manner previously described, to control the operation of the generator G may comprise a rod-like element which extends through the stub shaft 21 into the bore of the shaft 19, where it is slidably splined as indicated at 13ª to permit it to be moved axially. As shown at 13ᵇ this rod-like control element 13 is threaded in the stub shaft 21 so that as the shaft 19 is rotated to wind the spring 17, the control element is moved to its extended position and, as the spring unwinds it is moved inwardly.

Other means for utilizing the movement of an auxiliary control element of a spring motor to regulate the excitation of an electric generator will suggest themselves to those skilled in the art. It is to be understood, therefore, that the foregoing should be interpreted as illustrative and not in a limiting sense except as required by the prior art and by the spirit of the appended claims.

I claim as my invention:

1. In combination, an electric generator, spring means for driving said generator, and means responsive to the condition of tension of said spring for controlling the operation of said generator.

2. In combination, an electric generator comprising a stator and a rotor mounted for relative movement with respect to said stator, a spring motor for rotating said rotor, and means responsive to the condition of tension of said spring for causing relative movement between said rotor and stator.

3. The invention as set forth in claim 2 and wherein said stator comprises a tapered surface and said rotor is provided with a complementary taper.

4. The invention as set forth in claim 2 and wherein said motor comprises a shaft driven by said spring and said control element projects outwardly of said shaft a distance determined by the instantaneous condition of tension of said spring.

5. In combination, an electric generator comprising a stator and a rotor mounted for rotational and axial movement with respect to said stator, variable torque means for driving said generator, and means responsive to the intensity of the driving torque developed by said first mentioned means for causing relative axial movement between said rotor and stator.

ROBERT LESLIE HAYNES.